United States Patent [19]
Rollert

[11] Patent Number: 5,636,814
[45] Date of Patent: Jun. 10, 1997

[54] AUTOMATIC CLUTCH FOR A DOOR LATCH HANDLE

[75] Inventor: David A. Rollert, Everett, Wash.

[73] Assignee: The Boeing Company, Seattle, Wash.

[21] Appl. No.: 505,200

[22] Filed: Apr. 5, 1990

[51] Int. Cl.$^6$ ............................................. B64C 1/14
[52] U.S. Cl. .................... 244/129.5; 244/129.4; 292/304; 74/96; 49/215; 192/71
[58] Field of Search ................ 244/129.4, 129.5; 49/279, 215; 192/71; 74/96; 292/300, 304, 341.17

[56] References Cited

U.S. PATENT DOCUMENTS

| | | | |
|---|---|---|---|
| 2,582,928 | 1/1952 | Dall | 70/149 |
| 2,833,582 | 5/1958 | Henrichs | 292/336 |
| 3,491,605 | 1/1970 | MacDonald | 74/96 |
| 3,585,757 | 6/1971 | Ritchie | 49/215 |
| 3,647,169 | 3/1972 | Allwright et al. | 244/129 |
| 3,802,125 | 4/1974 | Baker | 49/360 |
| 4,106,729 | 8/1978 | Bergnam et al. | 244/137 |
| 4,125,235 | 11/1978 | Fitzgerald et al. | 244/129 |
| 4,180,943 | 1/1980 | Smith et al. | 49/279 |
| 4,199,120 | 4/1980 | Bergman et al. | 244/129.5 |
| 4,470,566 | 9/1984 | Fitzgerald | 244/129.5 |
| 4,548,304 | 10/1985 | Nagata | 192/71 |
| 4,560,123 | 12/1985 | Sealey et al. | 244/129.5 |
| 4,848,034 | 7/1989 | Pace | 292/304 |

*Primary Examiner*—Joseph F. Peters, Jr.
*Assistant Examiner*—Carla Mattix
*Attorney, Agent, or Firm*—J. Michael Neary; B. A. Donahue

[57] ABSTRACT

A clutch for an interior latch handle of a plug-type airplane door is described which decouples the handle from the latch-operating linkage so the handle will not be backdriven into the passenger space when the exterior latch handle is operated to open the door from outside the airplane. The clutch includes a probe mounted on the base of a handle mechanism assembly in line with the handle, and a pawl pivotally mounted in the handle and disposed to engage a lug splined to the handle shaft and torsionally coupled to the latch. When the handle is in its "home" or "closed" position, the probe engages a roller on the end of an arm connected to the pawl and rotates the pawl away from the lug so that the handle shaft will not backdrive the handle into the passenger space when the exterior latch handle is operated to unlatch the door. When the handle is moved away from the probe, the pawl engages the lug to establish two-way torsional coupling between the handle and the latch.

19 Claims, 9 Drawing Sheets

AUTOMATIC CLUTCH FOR A DOOR LATCH HANDLE

BACKGROUND OF THE INVENTION

This invention relates to airplane door latch mechanisms, and particularly to an automatic clutch for a latch handle that allows the door to be opened by an exterior latch handle without back-driving the interior latch handle, but also allows the interior latch handle to control the motion of the latch linkage in both directions during operation of the door using the interior latch handle.

Airplane doors for pressurized passenger jet liners are designed to resist air pressure greater on the inside of the door than the outside. For this reason, plug-type airplane doors have been developed which open inwardly so that the inside air pressure tends to hold the door closed, rather than relying on a hinge or latch mechanism on an outwardly opening door to resist the inside air pressure.

Some inwardly opening doors are mounted to translate into the cabin and into the space above the ceiling panels when opening to afford unimpeded access to the exit. An example of such a door is shown in U.S. Pat. No. 4,470,566 issued to James T. Fitzgerald and entitled "Plug-Type Aircraft Door Actuating Mechanism." This door is hung from a trolley which follows tracks to guide the door into the overhead space when the door is unlatched. A counterbalance spring acting through a cable drum facilitates manual opening and closing of the door.

The door shown in the Fitzgerald patent has an interior latch handle for opening the door from the inside of the airplane, and an exterior latch handle for use by airline service personnel for opening the door from the outside. The exterior latch handle is normally disengaged from the door latch linkage, so that operation of the interior latch handle does not cause the exterior latch handle to move. The reverse is not true, however. The interior latch handle should always be capable of opening the airplane door without any special procedures that could confuse passengers and delay opening of the door, so it should never be decoupled from the latch linkage. Therefore, operation of the exterior latch handle will backdrive the latch linkage, and the interior latch handle will be backdriven to rotate upwardly into the passenger space in the cabin. A passenger who happened to be sitting in the seat adjacent to the interior latch handle, when the exterior handle was operated, could be struck by that back-driven interior handle. This invention eliminates that possibility by decoupling the latch linkage from the exterior latch handle in the opening direction of the latch linkage when the handle is in its "home" position, so the latch linkage cannot drive the handle when it is in its home position, and by providing a one-way drive coupling between the latch linkage and the interior latch handle in the opening direction of the handle so the handle can always drive the latch linkage from the closed position thereof.

The latch linkage, through which the interior and exterior latch handles operate the door latch, includes an overcenter mechanism whose purpose is to ensure that any opening forces acting on the door will not open the door, but instead will be reacted against a fixed stop. As the interior latch handle is rotated by hand in the opening direction, the overcenter crank is rotated away from the fixed stop and the opening forces exerted on the door will be exerted on the interior latch handle in opposition to the opening rotation. When the over-center mechanism passes dead-center (at about 55 degrees of handle rotation) the over-center mechanism reverses the direction of the door-opening forces in the latch linkage, so that those forces tend to rotate the latch handle in the opening direction. If the handle is not restrained after passing the dead-center position of the overcenter crank mechanism, the latch linkage and the latch itself will shift suddenly to the fully unlatched position, resulting in mechanical impact and noise in the latch mechanism. The noise could alarm the passengers and could accelerate the wear on the linkage and associated mechanisms. This invention prevents the opening forces from being suddenly released when the overcenter mechanism passes dead-center, by automatically converting the latch handle from a one-way drive, which it is at the beginning of its motion, to a two-way drive before the dead-center position on the overcenter mechanism is reached, so the handle can restrain the latch linkage and control the rate of unlatching.

The operation of the latch handle must be simple and obvious, even to untrained passengers. Moreover, the operation of the door latch handle should give the passenger or crew member tactile and visual clues that the handle is being operated properly. That is, it must operate smoothly when swung in the correct direction, but strongly resist movement in any other direction. It must also present a moderate resistance to movement to prevent accidental or idle operation, or operation by young children playing with the handle. Finally, it should give a tactile feel through the handle that it is actually operating something, rather than just the zero resistance feel of a dummy handle, to give the operator a reassuring feed-back that he or she is operating the handle correctly. Each of these desirable features, present in the existing handle shown in the Fitzgerald patent, is retained in the automatically clutched handle of this invention.

SUMMARY OF THE INVENTION

Accordingly, it is an object of this invention to provide a clutch for an interior latch handle of an airplane door that will prevent the interior door latch handle from being back-driven when the latch linkage is operated by the exterior door latch handle. It is another object of this invention to provide such a clutch, wherein its operation is automatic and requires no special operating procedures that would be different from the operation of standard door latch handles. Still another object of this invention is to provide such a clutch, wherein the clutch mechanism is simple, rugged and reliable, and even if the mechanism fails, it will not prevent the handle from unlatching the door. It is yet another object of this invention to provide such a clutch, wherein the latch handle clutch does not adversely affect the function of any other mechanisms in the door system, so no modifications need be made to any of those systems, and their proven reliability and performance is unaffected, or even improved.

These and other objects of the invention are attained in a latch handle clutch which provides full time coupling between the latch handle shaft and the latch handle in the opening direction of the latch handle when the latch handle shaft is in its "closed" position, and provides two-way torsional coupling between the latch handle and the latch handle shaft when the handle is moved away from its home position toward the open position, but which decouples the handle and the handle shaft when the handle is in its "home" position which it occupies when the latch is in its latched position.

DESCRIPTION OF THE DRAWINGS

The invention and its many attendant objects and advantages will become more clear upon reading the detailed description of the preferred embodiment, in conjunction with reference to the following drawings, wherein.

DESCRIPTION OF THE PREFERRED EMBODIMENT

Figures 1, 4:
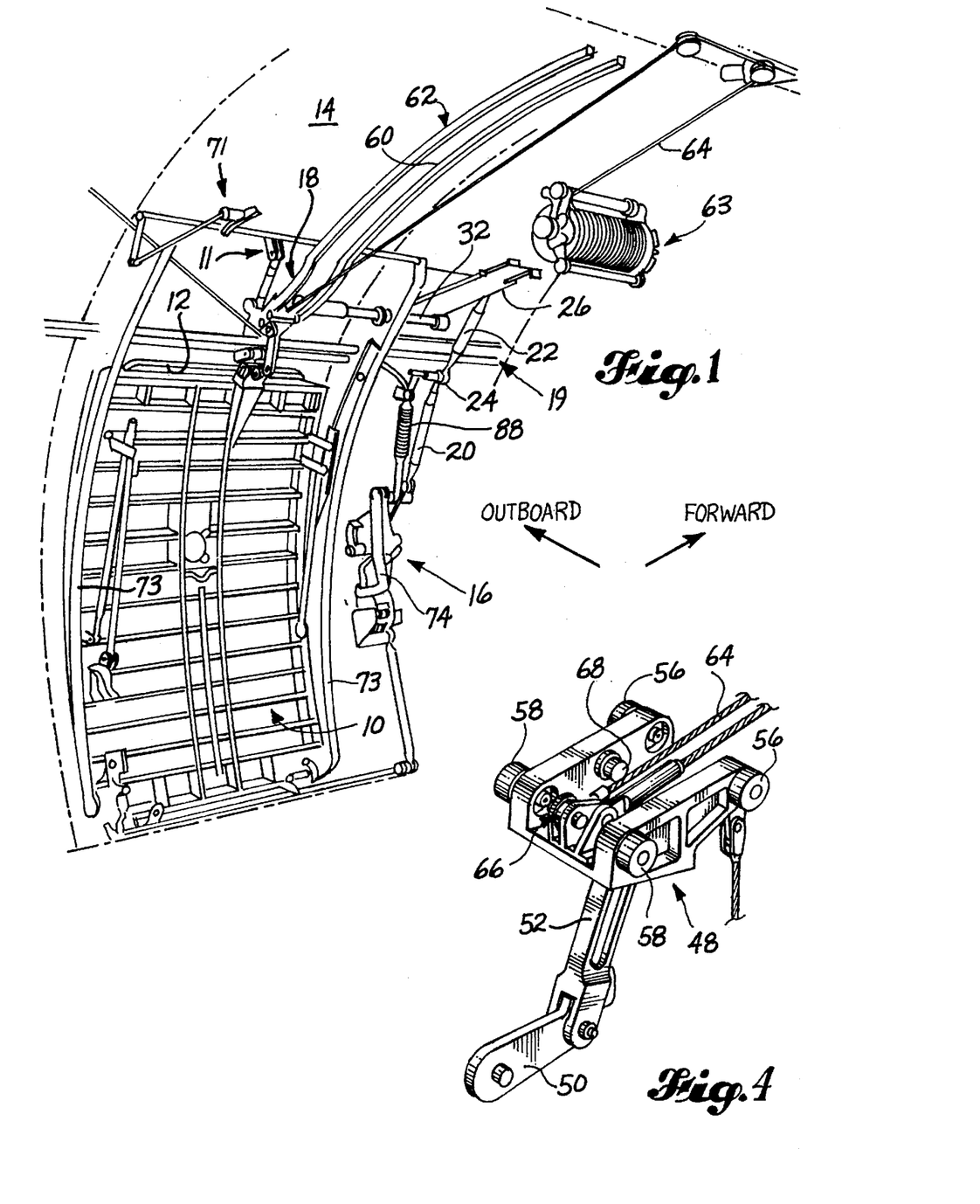
FIG. 1 is a perspective view of a section of an airplane fuselage and a plug-type door, along with a latch mechanism for latching the door shut and a handle mechanism assembly, in which the clutch of this invention is mounted, for operating the latch mechanism through a connecting latch linkage.
FIG. 4 is a perspective view of the trolley and the trolley link.

Referring now to the drawings, wherein like reference characters designate identical or corresponding parts and assemblies, and more particularly to FIG. 1 thereof, a door operating system is shown for an airplane plug-type door 10 mounted in an opening 12 in an airplane fuselage 14. The door operating system is fundamentally the same as that disclosed in U.S. Pat. No. 4,470,566, the disclosure of which is hereby incorporated by reference. The door operating system will be briefly described herein insofar as the mechanism is relevant to the door handle clutch of this invention.

Figure 2:
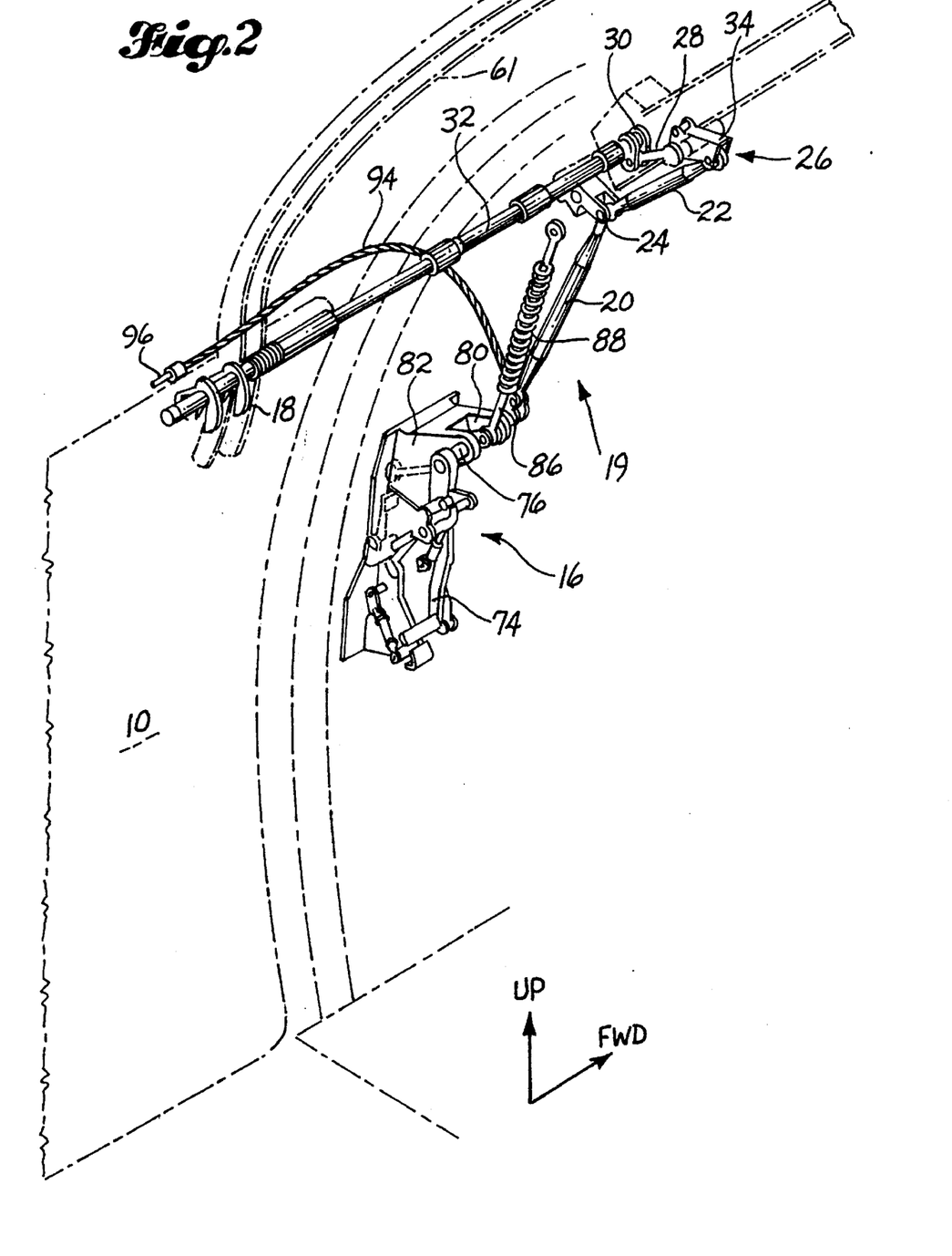
FIG. 2 is a more detailed close-up perspective view of the handle mechanism assembly, latch linkage, and door latch and trolley shown in FIG. 1.

For purposes of the description herein, it will be assumed that the door and door operating mechanism shown in FIGS. 1 and 2 are on the port side of the airplane, so the view is looking forward and outboard. The terms "forward" or "front end", "upward" or "upper end" and "outboard" etc. will be with reference to FIG. 1 unless otherwise noted, and the terms "clockwise" and "counterclockwise" will be with reference to the viewer looking forward or outboard, as appropriate. Naturally, these terms are not intended to limit the scope of the claims except as to the positions or orientation of the parts relative to each other in the claimed structure.

The door operating system, shown most clearly in FIG. 2, has a handle mechanism assembly 16 which operates to rotate a door latch 18 by way of a latch linkage 19, including a pair of push rods 20 and 22 connected at their adjacent ends by an idler crank 24 which keeps the push rods 20 and 22 close to the fuselage. The upper end of the upper push rod 22 is connected to an overcenter mechanism 26, whose function will be described below. An overcenter link 28 connects an overcenter crank 34 to a crank arm 30 attached to a torque tube 32 to which the latch 18 is connected, and by which it is rotated to latch and unlatch the door 10.

Figure 3:
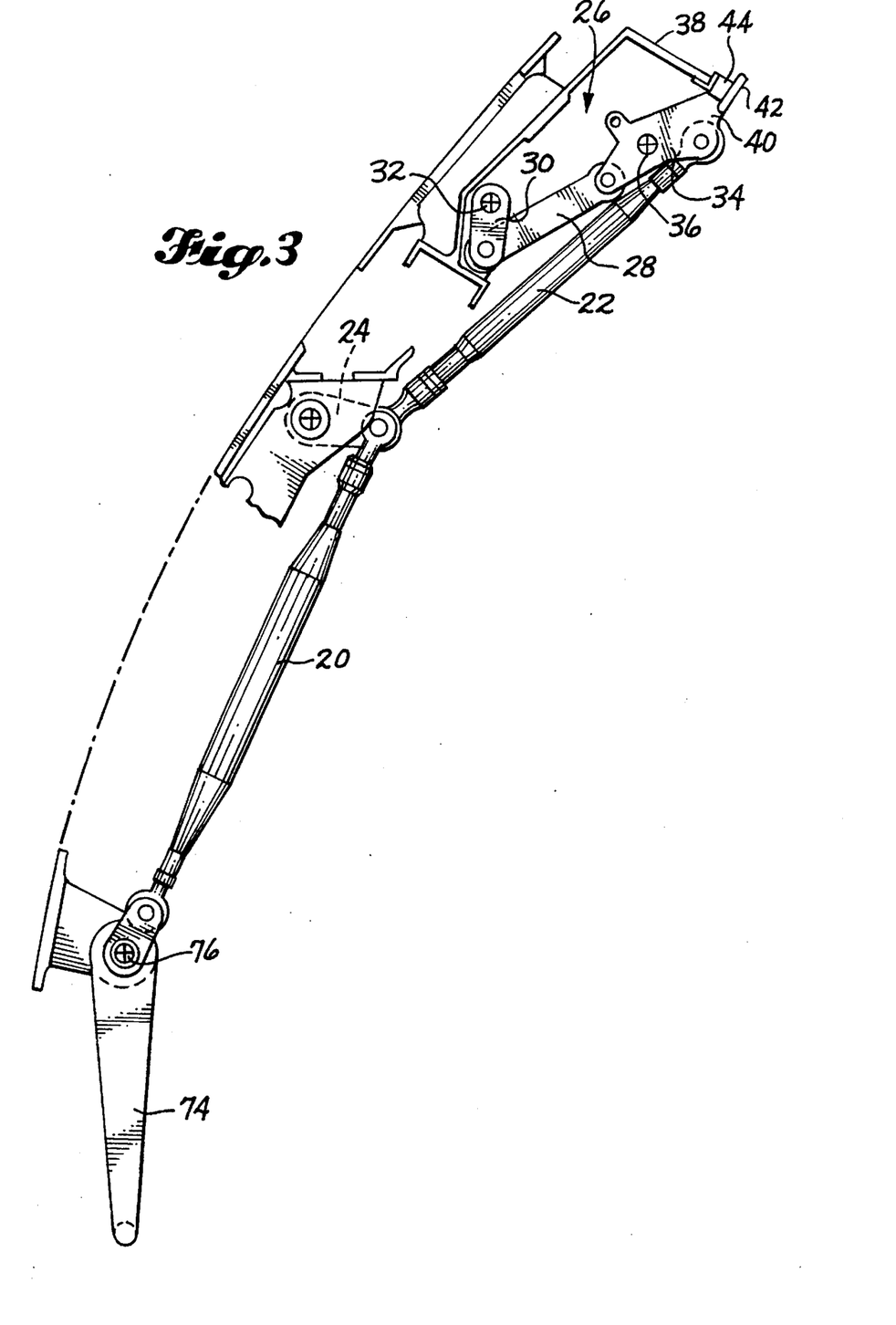
FIG. 3 is an elevation of the latch handle and a portion of the latch linkage shown in FIG. 1, shown in the "latched" or "home" position, and showing an overcenter mechanism.

Referring now to FIG. 3, the over center mechanism 26 includes the overcenter crank 34 pivotally mounted on a pivot pin 36 in a housing 38. The upper end 40 of the overcenter crank 34 has a flange 42 which engages a fixed stop 44 on the housing 38. The engagement of the flange 42 with the fixed stop 44 prevents the overcenter crank 34 from rotating in a counterclockwise direction farther than the position shown in FIG. 3. This arrangement insures that the resilient elements, which exert forces acting on the door 10 in the door-opening direction and are transmitted through the latch 18, will be reacted against a fixed structure by way of the linkage between the latch 18 and the overcenter crank 34. These "resilient elements" include a torsion spring for counterbalancing the weight of the door 10, and a door seal 46, shown in FIG. 5, for sealing the door 10 in the opening 12.

The line of action of the over center link 28 at its position when the latch 18 is fully latched is to the right of the pivot pin 36, as shown in FIG. 3, so the overcenter crank 34 tends to be rotated counterclockwise to engage its flange 42 against the fixed stop 44 and prevent any opening forces on the latch cam from being exerted through the linkage to the handle mechanism assembly 16. Those opening forces acting on the door 10 and transmitted to the latch linkage 19 through the latch 18 are reacted through the over-center mechanism 26 against structure fixed within the airplane to insure that the door is held securely closed until the handle mechanism 16 is operated to open the door.

Figures 3A, 5:
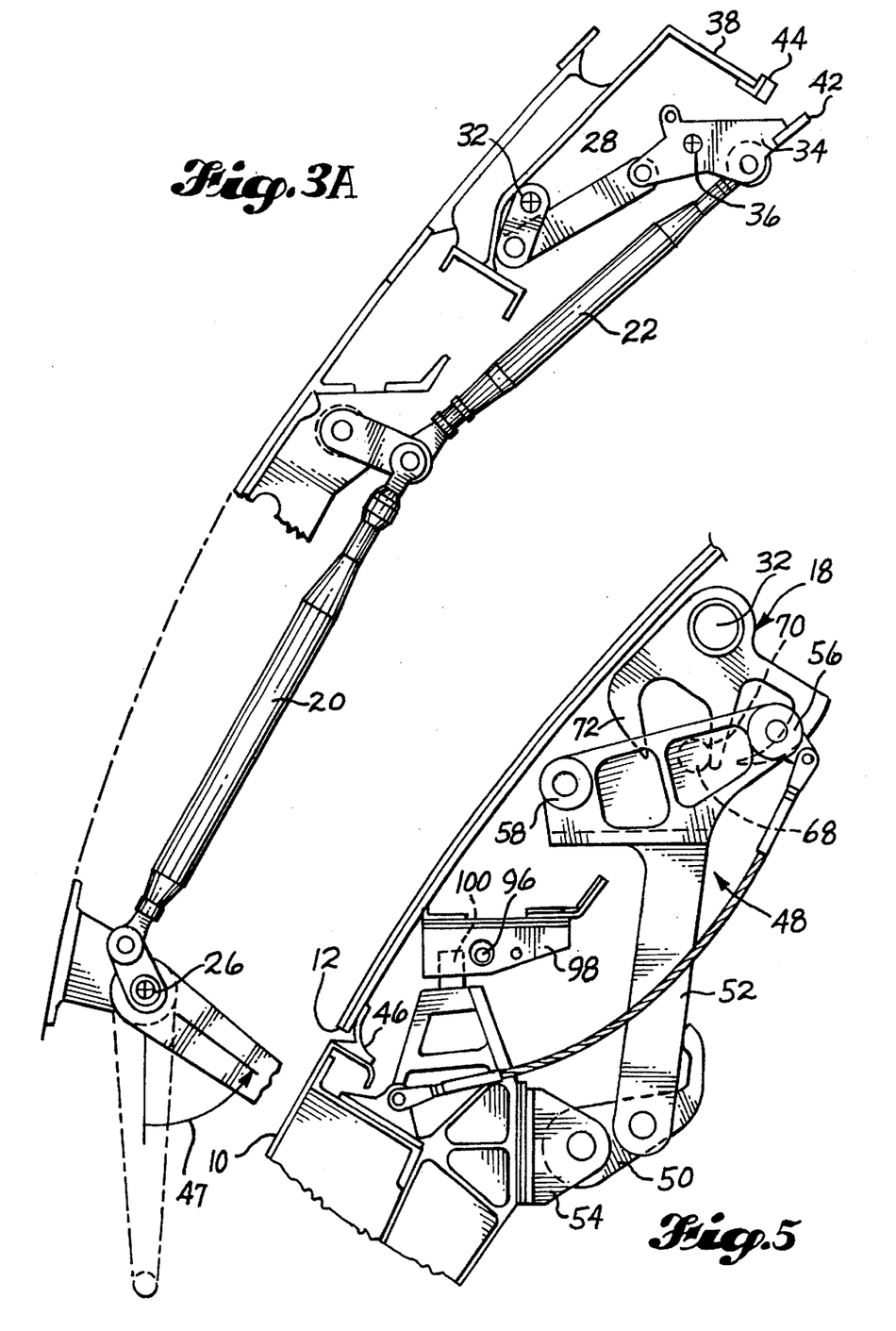
FIG. 3A is a view similar to FIG. 3, but showing the overcenter crank in its "dead-center" position.
FIG. 5 is an elevation of the latch in its latched position engaging a trolley to which the door is connected.

As the handle of the interior latch mechanism 16 is rotated in the opening (counterclockwise) direction indicated by the direction arrow 47 in FIG. 3A, the push rods 20 and 22 pull on the overcenter crank 34 and rotate it clockwise away from the fixed stop 44. The opening forces exerted on the door will now be transmitted through the over center crank 34, through the push rods 20 and 22 to the handle of the handle mechanism 16 resisting opening rotation of the handle. When the over-center crank 34 passes dead-center (at about 55° of handle rotation) as shown in FIG. 3A, the line of action of the over-center link 28 crosses the axis of the pivot pin 36 and reverses the direction of the torque on the overcenter crank 34. The door opening forces at this point now act to rotate the handle on the handle mechanism 16 in the counterclockwise direction instead of the clockwise direction. This 55° rotation of the handle, before torque reversal in the overcenter crank 34 occurs, provides an envelope in which the invention can function to "catch" the latch linkage 19 and prevent it from shifting suddenly to the fully opened position, as will be described below.

Turning now to FIGS. 4 and 5, a trolley 48 is shown attached to the upper end of the door 10 by a link 50 pinned between the lower end of an arm 52 on the trolley 48 and a clevis 54 attached to the door 10. The trolley 48 has a pair of inboard rollers 56 and a pair of outboard rollers 58 which travel in parallel spaced tracks 60 of a trolley guide 62. The weight of the door 10 and its attached mechanisms and systems (including an inflatable emergency slide stowed in a compartment not shown on the door 10) is counterbalanced by a torsion spring acting through a counterbalance drum 63 around which one end of a counterbalance cable 64 is wound. The other end of the counterbalance cable is attached to the trolley at a clevis 66.

The trolley 48 includes a pair of opposed latch rollers 68, one on each side of the trolley, which are engaged, as shown in FIG. 5, by a latch cam 70 on the latch 18 to hold the trolley 48 and its attached door 10 in the closed position when the latch is in its latched position. When the latch 18 is rotated counterclockwise by the handle mechanism acting through the latch linkage 19, a pair of fingers 72 on the latch 18 engage the latch rollers 68 and force the trolley inboard along its trolley guide 62, pulling the door 10 away from the door opening 12. The counterbalance spring acting on the cable 64 pulls the trolley 48 a short way along its trolley guide 62 upward toward the ceiling in the fuselage 14 until the counterbalance spring force balances the weight of the door 10.

As shown schematically in FIG. 1, the latch linkage 19 is connected to a linkage 71 which, simultaneously with the unlatching of latch 18, shifts several ceiling panels to provide an opening through which the door 10 can be raised by hand along the trolley guide 62 and a pair of lower door guides 73 on either side of the door, to a position above the ceiling panels and completely clear of the opening 12 in the fuselage 14.

Figure 6:
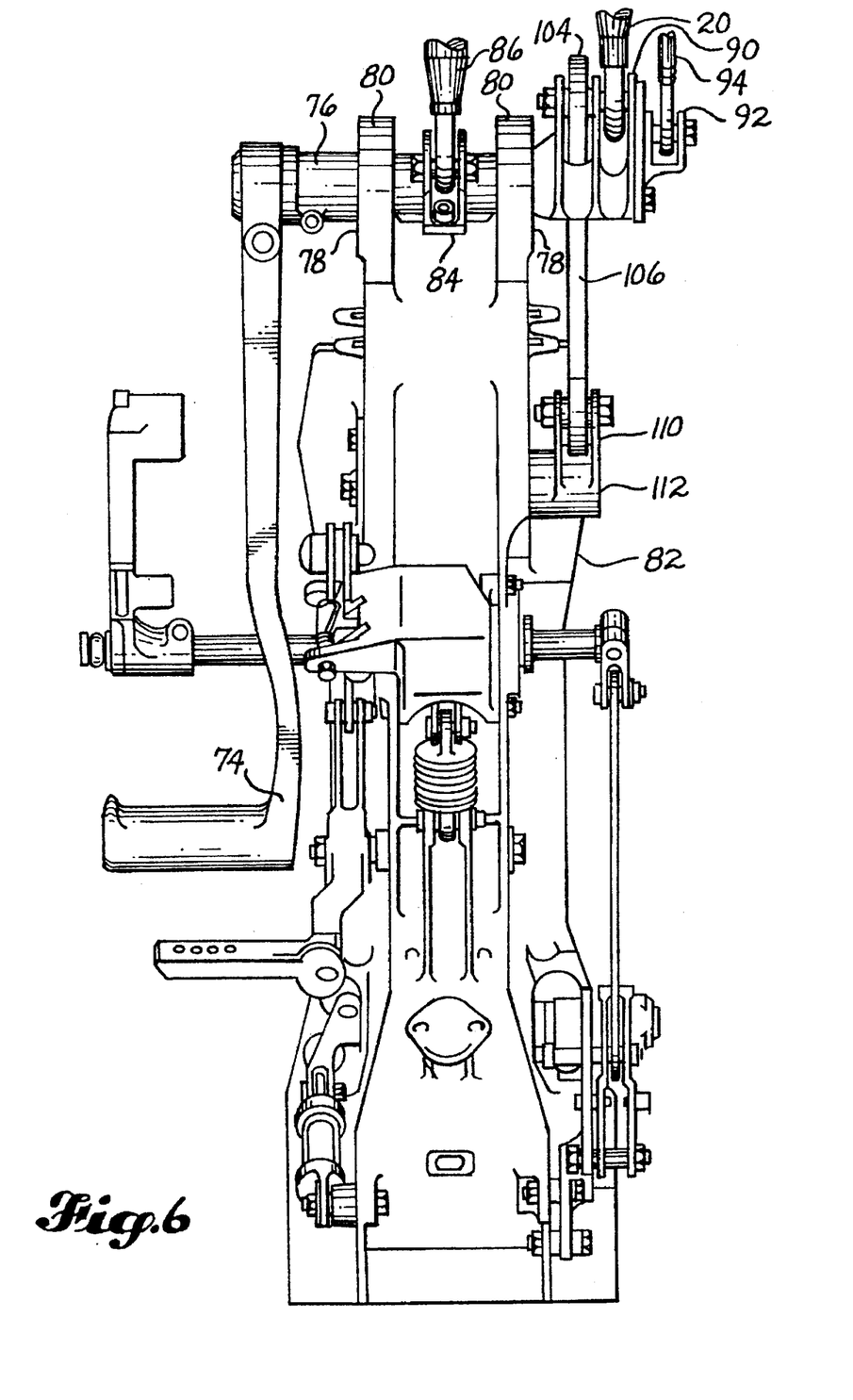
FIG. 6 is an elevation of the handle mechanism assembly.
Figure 7:
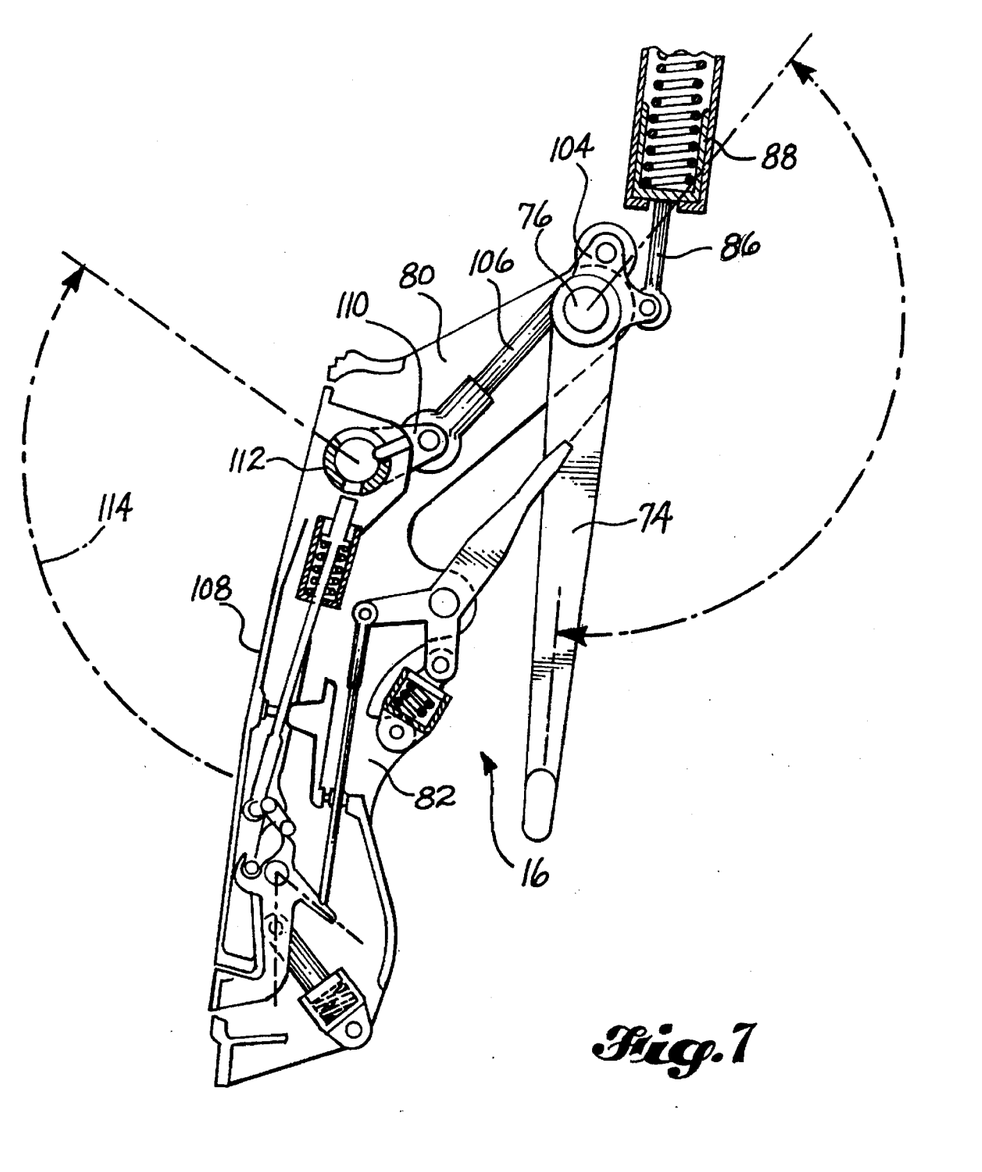
FIG. 7 is a sectional elevation of the handle mechanism assembly shown in FIG. 6, but looking forward.

The handle mechanism assembly 16, shown in FIGS. 6 and 7, includes an interior latch handle 74 pivotally mounted on an interior latch handle shaft 76 for rotation thereon. The handle shaft 76 is mounted for rotation in a pair of spaced bearings 78 in two spaced arms 80 projecting from a base 82 on which the parts of the handle mechanism assembly are mounted. The handle shaft 76 extends between the bearings 78 in the arms 80 and beyond them on both ends. The handle 74 is mounted on one end of the shaft 76, three cranks are mounted on the other end, and one crank 84 is mounted in the center between the two arms 80. The center crank 84 connects to a rod 86 of a snubber spring 88 that holds the latch linkage 19 in the unlatched position and slows handle travel at both extremes of travel to make the handle easier to operate.

The middle crank 90 on the forward end of the handle shaft 76 is connected to the lower pushrod 20 by which the handle operates the overcenter mechanism 26. The outside crank 92 connects to a cable 94 for operating a safety latch pin 96. As more completely described in the Fitzgerald patent, the latch pin 96, in its latched position, bridges a clevis 98 mounted on the top of the door frame and blocks movement of a guide roller 100 attached to the top of the door 10 until the latch pin is withdrawn by rotation of the handle shaft 76. The latch pin 96 also contacts a limit switch (not shown) in the extended or latched position of the latch pin 96 to provide an electrical signal that the handle 74 is in its fully latched position.

Figure 8:
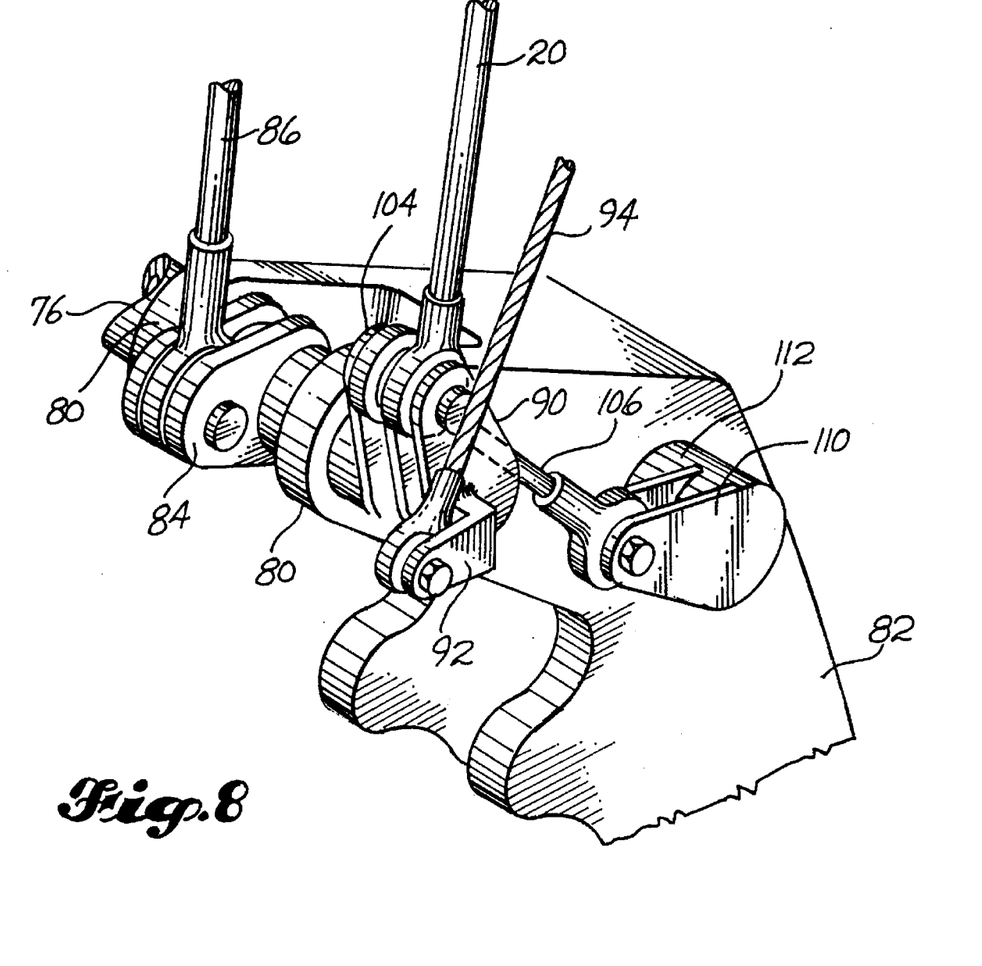
FIG. 8 is an enlarged perspective of the top portion of the handle mechanism assembly, showing the interior latch handle shaft and portions of the mechanisms operated thereby.

Referring to FIGS. 6, 7 and 8, the inside crank 104 on the forward end of the handle shaft 76 is connected to a connecting rod 106 for connecting an exterior latch handle 108 to the latch linkage 19 so that the door 10 can be latched and unlatched from outside the airplane using the exterior latch handle. The connecting rod 106 is connected at its lower end to a crank 110 attached to an exterior latch handle shaft 112 journalled in the handle mechanism base 82. Lifting the exterior latch handle 108, as indicated by the direction arrow 114, will rotate the exterior latch handle shaft 112 and the crank 110, pulling down on the connecting rod 106 and rotating the crank 104 to rotate the interior latch handle shaft 76 and operate the latch linkage 19 and the door latch 18, just as if the interior door latch handle 74 had been used.

Figures 9, 10:
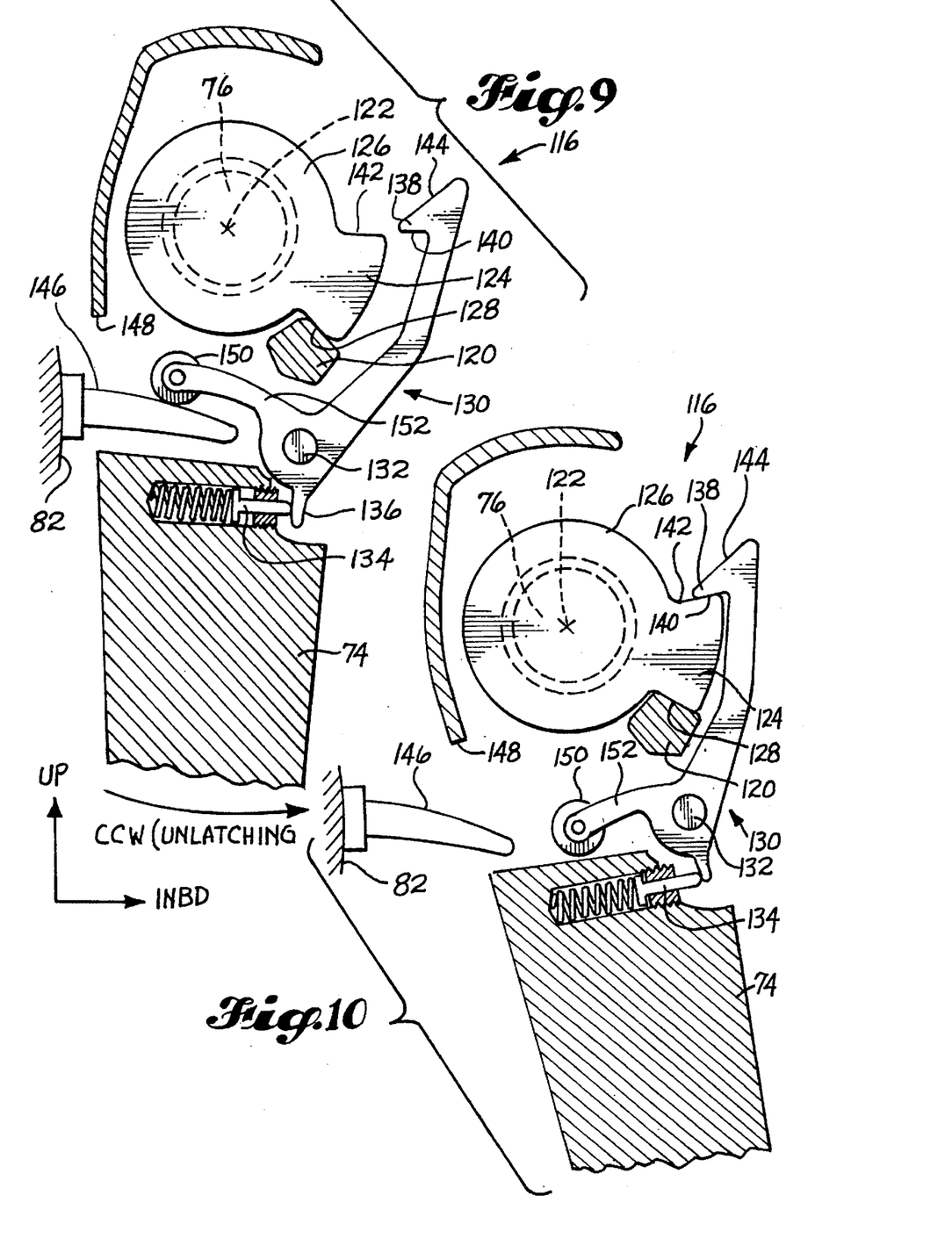
FIG. 9 is a sectional elevation of the interior latch handle showing the clutch of this invention in the "home" position of the interior latch handle.
FIG. 10 is a sectional elevation of the handle shown in FIG. 9, but with the handle in an intermediate position between its "home" position and its "open" position and with the coupling means engaged.

Turning now to FIG. 9, a handle clutch 116 according to this invention is shown mounted in the handle 74, shown in the "home" or fully stowed position of the handle 74, which is the position it occupies when the door 10 is closed and latched shut. In this "home", or 0° position (also illustrated in FIG. 1) the handle hangs straight down from the handle shaft 76 and does not project into the passenger space inside the airplane, that is, the space inside the fuselage designed to be occupied by the passengers and crew. In its other positions, the handle does project into the passenger space inside the airplane, which is appropriate when the handle is being operated by a passenger or crew member to open the door. However, when the door is being opened from outside the airplane, the exterior latch handle 108, operating through the connecting rod 106, backdrives the interior latch handle shaft 76 to operate the latch linkage 19, just as if the interior handle were being used to operate the latch 18. That is, all the other mechanisms connected to the interior latch handle shaft operate normally and the latch and all the other mechanisms operate normally, just as if the latch were being operated from within the airplane using the interior door latch handle 74, so no duplication of function with other mechanisms for use with the exterior latch handle is required. However, rotation of the interior latch handle shaft 76 by the exterior latch handle does have one disadvantage: it would backdrive an interior latch handle that was torsionally fixed to the handle shaft 76 into the passenger space and create a possibility of striking a passenger who might be in the path of the upward swing of the handle 74.

The clutch 116 torsionally decouples the interior latch handle shaft 76 from the interior latch handle 74 in the counterclockwise direction of the handle shaft 76 when the handle 74 is in its "home" position, and thereby prevents the interior latch handle 74 from being backdriven by the interior latch handle shaft 76 into the passenger space. The clutch 116 includes a one-way drive means for enabling the interior latch handle 74 to drive the interior latch handle shaft 76 in the counterclockwise direction. The one-way drive means includes a stop 120 rigidly fixed inside the handle 74 which drives the interior latch handle shaft 76 whenever the handle 74 is rotated in a counterclockwise direction. The driving connection between the stop 120 and the handle shaft 76 is an ear 124 on a lug 126 which is splined to the shaft 76. The stop 120 is fixed in the handle 74 in position to engage the ear 124, as follows: the radial distance of the stop 120 from the axis 122 of the interior latch handle shaft 76 is equal to the radial distance of the ear 124 from the shaft axis 122, and the angular position of the stop 120 around the shaft axis 122, when the handle 74 is in its "home" position and the latch handle shaft 76 is in its fully latched position as shown in FIG. 9, is immediately adjacent to the clockwise-facing surface 128 of the ear 124. Thus, the one way drive means is not subject to any mechanism failures that could prevent unlatching, and when the handle shaft 76 is in its fully latched position, rotation of the handle 74 will always rotate the handle shaft 76 toward its opened position.

The clutch 116 also includes a means for coupling the latch handle 74 to the latch handle shaft 76 for two-way driving when the handle 74 is lifted away from its "home" position toward its unlatched position. The coupling means includes a pawl 130 pivotally mounted in the handle 74 on a pivot pin 132 so that the pawl can pivot toward and away from the lug 126. A spring loaded plunger 134 bears against a tang 136 projecting from the pawl 130 to bias the pawl toward the lug 126.

A hook 138 is formed on the distal end of the pawl 130 and includes a clockwise facing surface 140 disposed to engage a corresponding counterclockwise facing surface 142 on the ear 124 when the pawl rotates in toward the lug 126, as will be described below. The length of the pawl 130 from the pivot pin to the hook surface 140 is just enough to enable the hook surface 140 to engage the ear surface 142 when the stop 120 is abutting the ear surface 128 and the pawl rotates inward toward the lug 126. The end of the pawl is beveled at 144.

The clutch 116 includes a decoupling means for decoupling the latch handle shaft 76 from the handle 74 in the counterclockwise direction on the latch handle shaft 76 whenever the handle 74 is in its home position. The decoupling means includes a projection or probe 146 fastened to the base 82 of the handle mechanism assembly 16 and extending through a hole 148 in the outboard side of the handle 74. The probe 146 has a curved or sloping upper surface that functions to cam the pawl 130 away from the lug 126 when the handle 74 is in its "home" position. As the handle swings toward the probe 146, the probe 146 engages a roller 150 mounted on the end of an arm 152 attached to the pawl. The arm 152 and the pawl 130 form a bell crank which is pivoted at its fulcrum on pivot pin 132, so that the camming up of the arm 152 causes the bell crank to rotate about the pivot pin 132 clockwise and rotate the pawl 130 away from the lug 126 so that the latch handle shaft 76 may rotate counterclockwise without driving the handle 74 into the passenger space.

In operation, the handle is normally in its stowed or "home" position. When it is desired to open the door 10 from the inside of the airplane, a passenger or crew member grasps the handle 74 and rotates it inboard and upward. The stop 120 in the handle 74 engages the clockwise facing surface 128 of the ear 124 and drives the lug 126 and the attached interior latch handle shaft 76 in the counterclockwise direction. The latch handle shaft 76 drives the latch linkage 19 to unlatch the latch 18 as previously described. Since the stop 120 is fixed to the handle, the handle will always drive the lug 126 and its attached latch handle shaft 76 whenever they are operated from the "latched" position of the latch linkage 19, in which the latch 18 is in its latched position.

As the handle rotates away from its "home" position, the roller 150 on the end of the arm 152 rolls down the slope of the upper surface of the probe 146, and the spring loaded plunger 134 pushes on the tang 136 to rotate the pawl 130 counterclockwise about the pivot pin 132, as permitted by the rotation of the arm 152. When the roller 150 rolls off the end of the probe 146, as shown in FIG. 10, the hook 138 on the pawl 130, under the influence of the spring-loaded plunger 134, moves fully into engagement with the counterclockwise facing surface 142 of the ear 124, thereby fully coupling the handle 74 with the handle shaft 76. After automatically establishing 2-way torsional coupling between the handle 74 and the handle shaft 76 within the rotational envelope permitted by the overcenter mechanism 26 before it permits torque reversal in the latch linkage 19 at dead-center, the handle can be used to control the motion of the handle shaft 76, so that the handle 74 may be used to control the movement of the latch linkage to prevent mechanical noise and wear that would otherwise result from sudden movement of the latch linkage and the trolley 48 on reversal of torque at the overcenter crank 34.

Figures 11, 12:
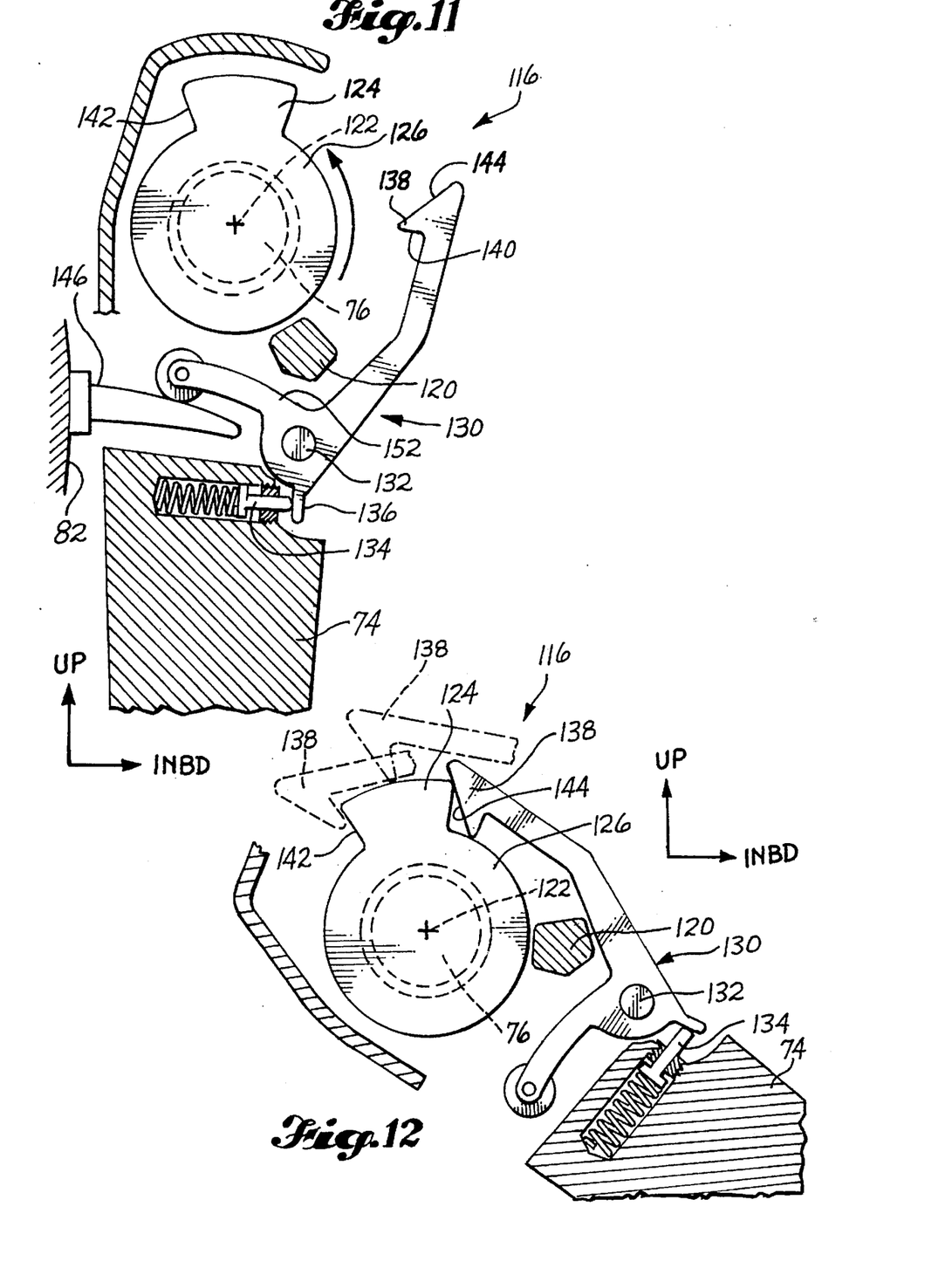
FIG. 11 is a sectional elevation of the handle shown in FIG. 9, with the handle in its "home" position and decoupled from the latch linkage and the latch linkage in the unlatched position.
FIG. 12 is a sectional elevation of the handle shown in FIG. 9, with the coupling means shown moving into engagement with a lug on the latch linkage in its unlatched position.

If the door 10 is opened from the outside of the airplane using the exterior latch handle 108, the interior latch handle shaft 76 will be driven in the counterclockwise direction by the connecting rod 106, but the interior latch handle 74 will remain in its vertical or "home" position as shown in FIG. 11 because the pawl 130 remains lifted clear of the ear 124. There is thus no danger that a passenger sitting in a seat adjacent to the door 10 could be struck by the handle 74. However, when it is desired to latch the door from the inside and the handle 74 is in its "home" position, but the latch 18 and the latch linkage 19 (including the handle shaft 76) are still in the "unlatched" or "opened" position, it is merely necessary to lift the handle to its fully "open" position as shown in FIG. 12. This causes the bevel 144 on the end of the pawl 130 to ride over the ear 124 and the hook 138 to drop behind and engage the ear 124 so that the handle is torsionally coupled with the interior latch handle shaft 76 in both rotational directions.

With the hook 138 engaged with the ear 124, movement of the interior latch handle toward its home position will drive the lug 126 in the clockwise direction and operate the latch linkage 19 to move the latch 18 toward its "latched" position. Naturally, it also rotates the cranks that operate the other functions controlled by the handle shaft 76, so the door mechanism assembly operates as though the handle were splined to the handle shaft 76 whenever the hook 138 is engaged with the lug ear 124.

The handle clutch of this invention thus meets all of the objects stated previously. It enables the interior latch handle 74 to operate normally to open the door 10 from the inside just as a standard handle operates, with no special procedures required that could confuse or create delay in time of emergency, but it prevents the exterior latch handle from backdriving the interior latch handle 74 into the passenger space when the exterior latch handle is operated. By providing the clutch between the interior latch handle 74 and the interior latch handle shaft 76, the exterior latch handle operation and function remain completely unchanged from the proven, highly reliable structure that existed previously, and the handle mechanism assembly 16 and latch linkage 19 also operate and function the same. The only difference introduced by the new structure is that the interior latch handle 74 is not backdriven by the exterior latch handle, and when it is desired to latch the door 10 from the inside of the airplane after it had been unlatched from the outside, it is merely necessary to lift the interior latch handle 74 to its unlatched position so it can be moved to its latched position to operate the latch 18. The operation of the handle is simple, logical and natural and could never be used in a way that would fail to unlatch the door 10. It substantially improves the operation of the handle mechanism assembly 16 without introducing any disadvantages.

Obviously, numerous modifications and variations of the described handle clutch are possible in view of this disclosure. Accordingly, it is expressly to be understood that these modifications and variations, and the equivalents thereof, are to be considered within the spirit and scope of the claims, wherein I claim:

1. A clutch for an airplane door latch handle for selectively coupling said latch handle to a door latch linkage for operation of a door latch, and for decoupling said latch handle from said latch linkage to prevent an outside door latch lever from backdriving said latch handle when said latch lever is operated to open the airplane door from the outside, said clutch comprising:

means for automatically decoupling said door latch linkage from said latch handle when said latch handle is in its "closed" position, such that said door latch linkage cannot backdrive said latch handle when said latch lever is operated to open said door from the outside of the airplane;

means for automatically coupling said latch handle and said door latch linkage when said latch handle is intermediate its "opened" position and its "closed" position, such that said latch handle is effective to operate said latch-operating linkage in both opening and closing directions;

means forming a one-way driving connection between said latch handle and said door latch linkage when said latch handle is in its "closed" position, such that moving said latch handle from its "closed" position toward its open position is always effective to operate said door latch linkage, but movement of said door latch linkage in the opening direction would be ineffective to back-drive said latch handle.

2. The clutch defined in claim 1, wherein said decoupling means includes:

a projection fastened to structure adjacent to said latch handle when said latch handle is in its "closed" position; and a lever associated with said coupling means for engaging said projection when said latch handle is in its closed position to decouple said coupling means from said door latch linkage.

3. The clutch defined in claim 2, wherein:

said coupling means includes a pawl that is resiliently mounted for rotation on said latch handle in a position to engage an element fixed to said door latch linkage and move said door latch linkage toward its "latched" position when said latch handle is moved toward its "closed" position; and said lever is rigidly connected for rotation with said pawl;

whereby said lever will engage said projection when said latch handle is moved to its "closed" position, and said projection will rotate said lever arm, causing said pawl to rotate out of engagement with said element so that said door latch linkage can be moved by said outside door latch lever without backdriving said latch handle.

4. The clutch defined in claim 1, wherein:

said coupling means includes a pawl that is resiliently mounted on said latch handle in a position to engage an element fixed to said door latch linkage and move said door latch linkage toward its "latched" position when said latch handle is moved toward its "closed" position.

5. The clutch defined in claim 4, wherein:

said pawl is rotatably mounted in said latch handle; and said decoupling means includes a lever arm rigidly connected for rotation with said pawl, and a projection disposed in a position to engage said lever arm when said latch handle is moved to its "closed" position and rotate said lever arm, causing said pawl to rotate out of engagement with said element so that said door latch linkage can be moved by said outside door latch lever without backdriving said latch handle.

6. The clutch defined in claim 5, wherein:

said door latch linkage includes an over-center crank which causes forces acting on the door in the door-opening direction to be transmitted through said door latch linkage to said latch handle to resist the movement of said latch handle as it moves in the opening direction, until the over-center crank passes dead-center, whereupon the torque on said handle reverses direction and tends to rotate said handle in its opening direction; and said projection extends out from said structure only far enough to engage said projection engaging means during closing movement of said latch handle while door-opening forces transmitted through said over-center crank act to drive said latch handle toward said "home" position.

7. The clutch defined in claim 4, wherein:

said door latch linkage includes a shaft on which said latch handle is rotatably mounted, and said linkage element includes a lug which is fastened to said shaft, said lug having a first angularly facing surface;

said pawl includes a hook engagable with said angularly facing surface of said lug, and a bevel on said pawl for camming said pawl over said lug when said handle is moved toward said "opened" position so that said hook can resiliently move into engagement with said angularly facing surface of said lug to rotate said lug and its attached latch handle shaft when said latch handle is moved toward its "closed" position.

8. The clutch defined in claim 7, wherein:

said one-way connection means includes a stop fixed to said latch handle, and a second angularly facing surface on said lug, said stop and said second angularly facing surface being at equal radial distances from the axis of said shaft, whereby said stop will engage and move said lug when said handle is rotated in one direction, but will not be driven by said lug when said shaft is backdriven by said outside door latch lever.

9. The clutch defined in claim 8, wherein:

said lug includes an ear with two angularly facing surfaces which are engaged during opening and closing of said latch by said stop and said hook, respectively; and said hook and said stop are angularly spaced apart in said latch handle by a distance just slightly larger than said ear.

10. The clutch defined in claim 7, wherein:

said door latch linkage includes an over-center crank which causes forces due to resilient elements acting on the door to be transmitted through said door latch linkage to said latch handle to resist the movement of said latch handle as it is moved in the opening direction, until the over-center crank passes dead-center, whereupon the torque on said handle reverses direction and tends to rotate said handle in its opening direction; and said projection extends out from said structure only far enough to engage said projection engaging means during closing movement of said latch handle after said latch has been rotated to its fully latched position, and during opening movement of said latch handle said projection engaging means has moved clear of said projection so that said hook is engaged with said first angularly facing surface of said lug when said over-center crank passes dead-center.

11. The clutch defined in claim 10, wherein:

said pawl and said projection engaging means are in the form of a bell crank having two lever arms connected at a fulcrum, said bell crank being pivotally mounted at said fulcrum in said latch handle, said projection engaging means comprising one lever arm of said bell crank having a roller mounted on the free end thereof for engagement with said projection, and wherein said pawl comprises the other arm of said bell crank;

whereby said one lever arm will engage said projection when said latch handle is moved to its "closed"

position, and said projection will rotate said lever arm which will cause said pawl to rotate out of engagement with said element so that said door latch linkage can be moved by said outside door latch lever without back-driving said latch handle.

12. The clutch defined in claim 4, wherein:

said door latch linkage includes an over-center crank which causes forces acting on the door in the door-opening direction to be transmitted through said door latch linkage to said latch handle to resist the movement of said latch handle as it moves in the opening direction, until the over-center crank passes dead-center, whereupon the torque on said handle reverses direction and tends to rotate said handle in its opening direction; and a projection extends out from structure adjacent to said latch handle when said latch handle is in its "closed" position, said projection extending only far enough to engage said pawl during closing movement of said latch handle while door-opening forces transmitted through said over-center crank act to drive said latch handle toward said "home" position, said projection being short enough to disengage from said pawl, during opening movement of said latch handle, when said over-center crank passes its dead-center position, so that said pawl is engaged with said element when said over-center crank passes said dead-center position.

13. A method of operating an airplane door latch, for latching and unlatching an airplane door mechanism, by use of either one of an interior door latch handle and an exterior door latch handle without causing movement of either latch handle when the other latch handle is moved in its opening direction, comprising:

providing a one-way drive connection between said interior latch handle and a latch-operating linkage such that movement of said interior latch handle from a "home" position toward an "opened" position when said latch-operating linkage is in its "closed" position will move said latch-operating linkage to shift said latch to its unlatched position;

automatically coupling said interior latch handle to said latch-operating linkage for two-way torque transmission between said interior latch handle and said latch-operating linkage after said interior latch handle has been moved partially toward its open position;

automatically decoupling said interior latch handle from said latch-operating linkage in the opening direction of said latch-operating linkage when said interior latch handle is in its "closed" position;

whereby said interior latch handle will remain stationary when said exterior latch handle is operated to open said airplane door from the exterior of the airplane, so said interior latch handle will not be backdriven into the passenger space of said airplane when said exterior latch handle is operated.

14. The method defined in claim 13, wherein said decoupling step comprises:

automatically rotating a hook of a pawl attached to said interior latch handle out of engagement with a lug torsionally connected to said latch-operating linkage when said interior latch handle is in its "home" position;

whereby said latch-operating linkage can be driven by said exterior latch handle to unlatch said latch and open said door without backdriving said interior latch handle into said passenger space.

15. The method defined in claim 14, wherein said rotating step comprises:

engaging said pawl operatively with a projection extending from fixed structure adjacent to said interior latch handle when said interior latch handle is in said "home" position.

16. The method defined in claim 15, further comprising:

transmitting door-opening forces acting on said door from said latch to said interior latch handle through an over-center crank to resist the movement of said latch handle as it moves in the opening direction, until said over-center crank passes a dead-center position, and just beyond said dead-center position of said over-center crank, reversing the torque on said handle exerted by said door-opening forces so that said handle tends to be rotated in its opening direction;

said engagement of said pawl operatively with said projection occurs during closing movement of said latch handle while door-opening forces transmitted through said over-center crank act to drive said latch handle toward said "home" position.

17. The method defined in claim 13, wherein said coupling step comprises moving a hook of a pawl into engagement with a lug which is torsionally connected to said latch-operating linkage.

18. The method defined in claim 17, further comprising:

transmitting door-opening forces acting on said door from said latch to said interior latch handle through an over-center crank to resist the movement of said latch handle as it moves in the opening direction, until said over-center crank passes a dead-center position, and just beyond said dead-center position of said over-center crank, reversing the torque on said handle exerted by said door-opening forces so that said handle tends to be rotated in its opening direction;

said decoupling step includes holding said pawl clear of said lug with a projection extending from fixed structure adjacent to said handle; and said engagement of said hook with said lug includes operatively disengaging said pawl from said projection during opening movement of said latch handle, before said over-center crank passes its dead-center position, so that said pawl is engaged with said lug when said over-center crank passes said dead-center position.

19. In an airplane door having a latch handle for operating a door latch from the inside of the airplane, and a latch handle shaft on which the latch handle is mounted for rotation relative thereto, a clutch for selectively coupling said latch handle to said latch handle shaft which enables the latch handle to be operated normally from inside the airplane to latch and unlatch the door, and which decouples the latch handle shaft from the latch handle in the opening rotational direction of the shaft when the latch handle is in its normally latched position to prevent the latch handle from being back-driven by an outside latch lever when the door is opened from the outside, said clutch comprising:

a lug splined to said latch handle shaft for rotation therewith, and having a projecting ear by which said lug can be rotated to rotate said latch handle shaft;

a stop fixed to the latch handle at a position spaced radially from said latch handle shaft equal to the radial spacing of said ear from said handle shaft, so that said stop will engage said ear when said handle is rotated about said handle shaft in the unlatching direction of said latch handle;

a pawl pivotally mounted on a pawl pivot on said latch handle for rotation with said latch handle, said pawl having a hook at one end at an angular position which is spaced from the angular position of said stop about equal to the angular width of said ear;

said pawl having a beveled side at said one end that can ride over said ear so that said hook can drop behind and engage said ear when said handle is rotated from its "closed" position toward its "opened" position and said lug has already been rotated toward its "opened" position;

a spring, bearing against said pawl and urging said hook into engagement with said lug;

a projection fixed to structure adjacent to said handle in the "closed" position thereof;

a crank arm rigidly coupled to said pawl for rotation therewith about said pawl pivot and positioned opposite to said projection so that said projection engages said crank arm when said handle is in its "closed" position to rotate said crank arm and said pawl to lift said hook clear of said ear, and thereby torsionally decouple said latch handle shaft from said latch handle when said latch handle is in its "closed" position.

* * * * *